Aug. 15, 1967  J. A. WINGER  3,335,766
PORTABLE COMPRESSED AIR SUPPLY CART
Filed March 29, 1965  2 Sheets-Sheet 1

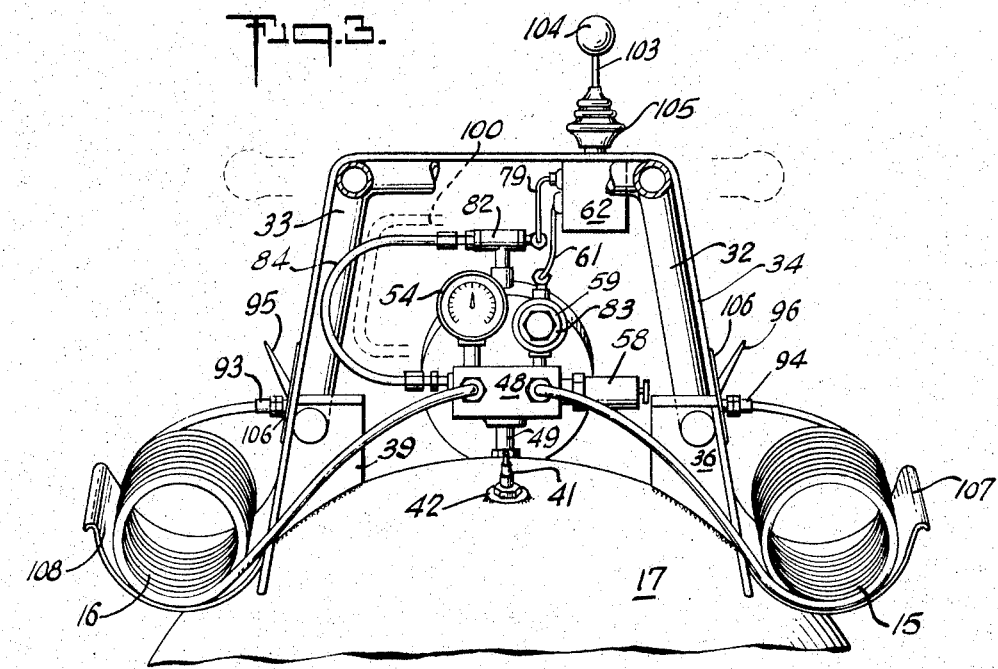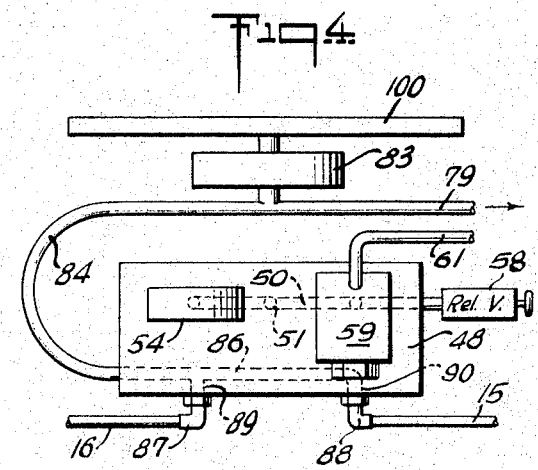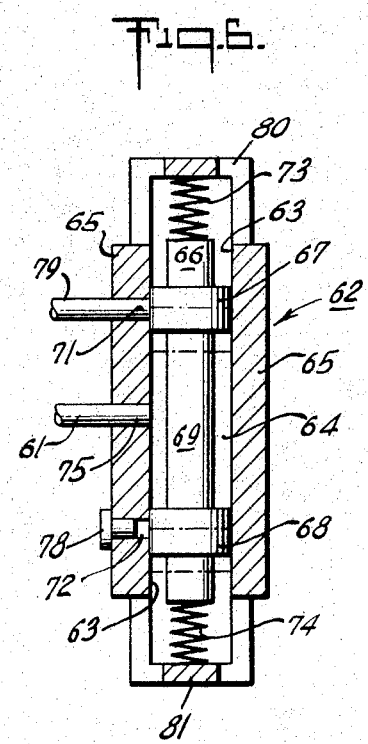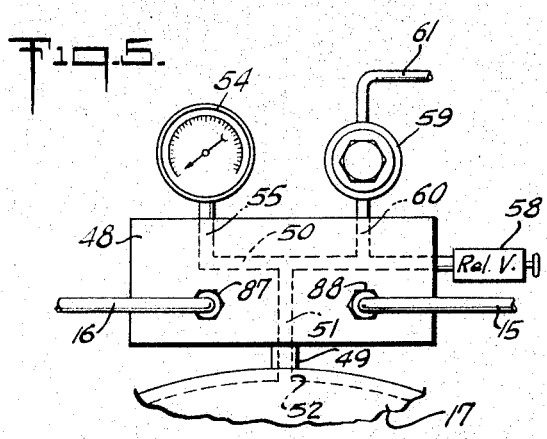

United States Patent Office 3,335,766
Patented Aug. 15, 1967

3,335,766
PORTABLE COMPRESSED AIR SUPPLY CART
Joseph A. Winger, Sarasota, Fla., assignor to Texaco Inc.,
New York, N.Y., a corporation of Delaware
Filed Mar. 29, 1965, Ser. No. 443,557
2 Claims. (Cl. 141—38)

ABSTRACT OF THE DISCLOSURE

A portable compressed air supply spherical tank mounted on two wheels and a leg. There are a pair of tire inflator hoses with valve chucks for connecting both side tires on a vehicle at once for balanced air pressure inflation. Also there is a large viewing low pressure gauge for observing the tire pressures at a distance.

This invention concerns a portable source of compressed air. More specifically, it relates to an ingeniously arranged compressed air tank with wheeled support therefor for ready portability and including dual hose connections for simultaneous filling of a pair of automotive tires therefrom.

In gasoline service stations today, it is common practice to have air supply for inflating automobile tires in the form of a fixed air hose outlet located conveniently near the building of the station. However, it is always at a permanent type of location which is usually quite separate or at least some distance from, the gasoline pumps of the service station. Furthermore, there is almost universally only a single air hose at each location where the compressed air is available (for tire inflation) so that air inflation of the tires on an automobile must of necessity be carried out singly, or one at a time.

Under modern high speed driving conditions, and particularly in view of some tendency for tire makers to relax the standards with respect to the construction of automobile tires, it is of great importance that proper inflation of tires be maintained. And it is particularly true that there should be equality, or balanced conditions, on both sides of the automobile, front and back.

While it has been heretofor suggested that a plurality of tires might be simultaneously inflated, the suggestion has been in the nature of a permanent type of structure such that the automobile would of necessity have to be located adjacent to the equipment for thus inflating tires simultaneously. Under modern conditions, and with the competition to provide superior service to customers increasing, it becomes of real importance for a gasoline service station to be able to give added convenience to its customers. Therefore, it is an object of this invention to provide a portable compressed air supply cart which includes therewith a pair of air hose outlets. In addition, the cart may have connections and valve arrangements such that two tires of an automobile may be simultaneously inflated to identical pressure.

Another object of the invention is the providing of a simple and easily portable compressed air cart, which includes thereon a large, readily viewed pressure gauge that may be observed while the tires of a customer's car are being inflated. Such pressure gauge is arranged for not only being easily viewed by a customer in the automobile (at a service station); but it is connected for registering the pressure that is simultaneously being applied to a pair of tires of such automobile. With such an arrangement, the attendant at a service station may connect both left and right sides of an automobile's front or rear tires, simultaneously. Also he may adjust the pressure, as desired by the customer, to the exact amount of pressure in pounds per square inch while the customer is able to observe at all times and determine the pressure being applied.

Not only may an attendant make the adjustment to a pair of tires simultaneously, but the adjustment is carried out by a lever which controls a three-position valve, such that the adjustment is quick and easy, with the pressure that is applied being adjustable either by adding more pressure or by reducing the pressure if too much exists, or has been added. Furthermore, when an adjustment is being made, if unbalance exists in the pair of tires that are connected for adjustment; it will immediately equalize the pressure therein either upon addition of, or reduction in pressure, when the adjustment lever is manipulated.

Another object of the invention is to provide a portable air cart containing compressed air as a source for automobile tire inflation. Such cart is constructed with a generally spherical pressure tank being mounted on wheels and a stationary standard, for easy and quick manipulation by service station attendants. By employing a generally spherical shape for the pressure tank, the structure may readily be made such that a relatively low force is required to change the position of the cart from mobile position (on the wheels thereof) to a stationary position when it is resting upon a standard element as one of a three point support.

Briefly, the invention may be described as a portable compressed air supply cart for servicing automobiles. Such cart comprises in combination a generally spherical tank for containing a supply of compressed air at a relatively high pressure, and a wheeled support for said tank to render it portable. It also comprises a pair of air hoses having outlet chucks at the free ends thereof, and means for connecting the other ends of said hoses in common to said tank.

More comprehensively, the invention may be briefly described as a portable compressed air supply cart for servicing automobiles which comprises in combination a generally spherical tank for containing a supply of compressed air at relatively high pressure, and a wheeled support for said tank to render it portable. It also comprises a pair of air hoses having outlet chucks at the free ends thereof, and a three position valve as well as a manifold and means for connecting the other ends of said hoses in common to said three position valve. In addition it comprises pressure reducing means and a large dial, low pressure gauge visible from the outside of said cart at a maximum angle therefrom. It also comprises means for connecting said gauge to said manifold and connecting means, in order to have said gauge read the pressure existing in said pair of hoses and the tires connected thereto.

Again briefly, the invention may be described as a portable compressed air supply cart having a generally spherical tank, and a three-wheeled support mounted at one lower side of said tank for providing portability of said tank on said three wheels. The cart additionally comprises a supporting leg with bumper mounted on the opposite lower side of said tank from one of said wheels for supporting said tank on two of said wheels and the bumper. The cart also comprises a hood mounted on the upper portion of said tank carrying a pressure gauge mounted thereon, and plural air hoses carried by said tank and adapted for simultaneous application to the filler inlet of two tires of a vehicle at one side thereof. Also, it comprises means for connecting said hoses to said pressure gauge for indicating the pressure in said two tires. The said gauge is positioned to face outward on said hood for viewing by an occupant in the vehicle when said compressed air supply cart is situated on said two wheels and bumper, adjacent to the vehicle in position for tire inflation or deflation.

The foregoing and other objects and benefits of the invention will be more fully set forth below in connection with the best mode contemplated of carrying out the invention, and in connection with which there are illustrations provided in the drawings, wherein:

FIGURE 3 is a fragmentary, greatly enlarged rear elevation, partly in cross section, showing control and indicating elements, plus air hose connections;

FIGURE 4 is a schematic diagram, showing in plan a manifold block and other elements shown in FIGURE 3;

FIGURE 5 is another schematic diagram, showing a front elevation of most of the elements illustrated in FIGURE 4; and FIGURE 6 is a schematic diagram, indicating a longitudinal cross section of a three position valve. This indicates the principles of the operation of a typical three position valve which may be employed.

In order to improve the service rendered at automobile filling stations, so that when customers desire to have the air pressure in their tires checked it will be unnecessary to move the automobile from the gasoline pump island to another location, it is desirable to provide a portable air cart according to this invention.

Thus, with a portable air cart according to this invention, an attendant at a gasoline station may fill the tires while the customer is waiting for the gasoline tank to be filled. This then provides an added service and convenience to the customer. Additional features of an air cart according to the invention include the use of a large sized pressure gauge mounted to be visible on the tank, so that the customer knows at all times exactly what pressure exists in the tires as they are connected up to the compressed air tank of the portable air cart.

Figure 1:
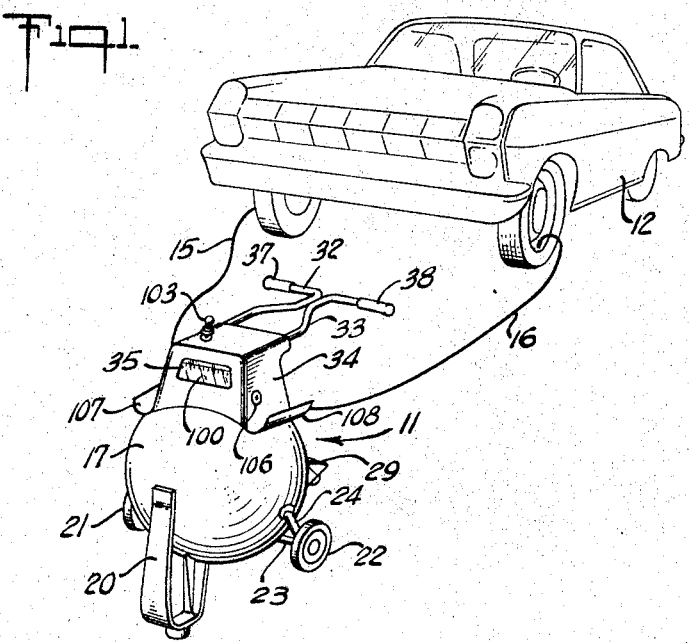
FIGURE 1 is a perspective, showing a compressed air supply unit according to the invention, located adjacent to a vehicle which has the tires thereof connected for inflation.

It is to be noted that while the FIGURE 1 illustration shows the portable air cart facing with the handle bars toward the vehicle having its tires inflated, this is actually in reverse of the procedure that is recommended. This will be obvious since the purpose of having a large sized, readily observable pressure gauge is so that the customer can observe this pressure indication as the tires of his vehicle are connected to the air cart. Consequently, in actual practice it would be expected that the air cart would be placed facing the other direction so that the gauge on the front of the hood attached to the top of the spherical air tank, would be facing toward the customer's automobile at all times. In other words, the view of the portable air cart itself that a customer would have, is substantially that view of the air cart per se which is shown in FIGURE 1, i.e., when the air cart alone is considered. However, in order to obtain this view of the air cart for the customer it would be positioned in the other direction, i.e., turned around one hundred eighty degrees so that the view of the air cart which the customer in the automobile would have is substantially that which is in view in the FIGURE 1 showing. Thus, not only does the customer obtain the additional convenience of having the tires inflated or checked while hi sautomobile is standing at the gasoline pump with gasoline being filled into the tank, but the arrangement is such that a pair of tires are inflated to identical pressure and consequently optimum balance is obtained by having equal pressure on both sides of the automobile.

Referring to FIGURE 1, it will be observed that there is illustrated—as a preferred embodiment—a portable compressed air supply cart 11. It is illustrated standing in a stationary position in front of an automobile 12, which has the front tires thereof connected for filling, or checking of the air pressure. Such airing of a pair of tires is done with a pair of air hoses 15 and 16, which are connected at one end of each to a high pressure spherical tank 17. The free end of each air hose has a chuck to permit clip-on connection at the filler valve stems of the automobile tires.

The spherical tank 17 is supported by two tripod supports having in common a pair of wheels 21 and 22. The third point of support of the tripod for stationary support, is a leg 20 that is preferably welded onto the tank 17 at the front thereof. The wheels are mounted on an axle 23 which is attached to the tank 17 by a pair of short legs 24. These legs 24 are preferably welded onto the outside surface of the tank 17, and they are attached in any feasible manner e.g. by welding to housing or bearing structure for the axle 23.

Figure 2:
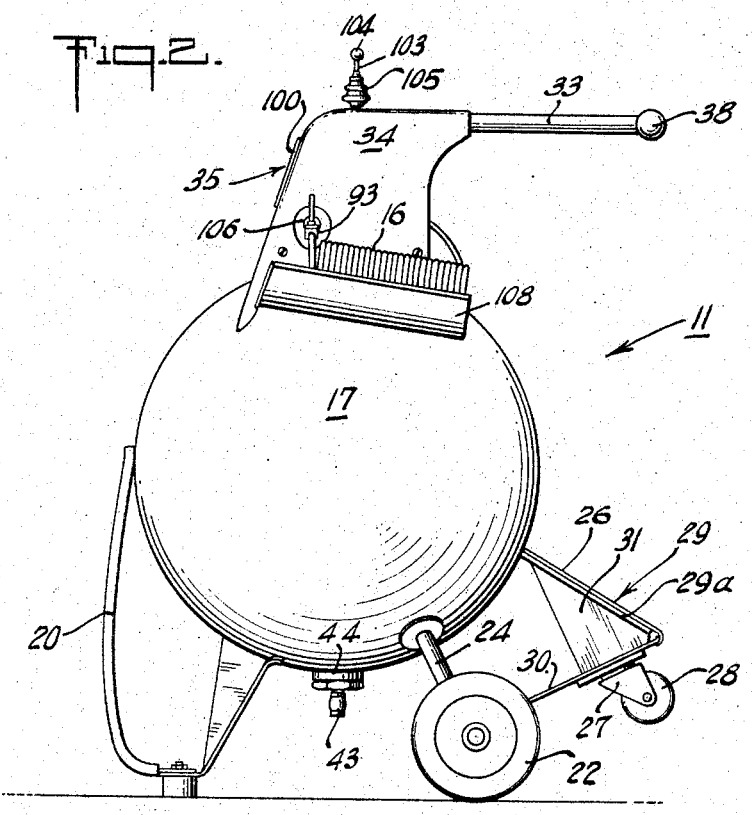
FIGURE 2 is an enlarged, side elevation, showing an air cart according to the invention in its stationary position.

In order to facilitate moving of the unit from one place to another, there is a third wheel 28 that forms the third point of support of the second tripod support. This third wheel 28 swivels on a caster support 27 that is attached to a rearwardly extending foot pad 29. The foot pad comprises a radially extending strip 29a that is welded onto the tank 17 and is attached at the outer end to a tangentially directed strip 30 that is, in turn, attached at its other end to the housing for axle 23. There is also a stiffening plate 31, preferably employed inside the angle formed between the strips 29a and 30. On the outer surface of the strip 29a there is a rubber mat 26 to avoid slipping, since the foot pad 29 provides an operator with a pressure point for applying some weight with his foot to tip the unit from its stationary position (as illustrated in FIGURES 1 and 2) into the mobile position (i.e., when it is resting upon the three wheels.)

Maneuvering of the unit is carried out manually by means of a pair of handle bars 32 and 33 which extend rearwardly in a generally horizontal manner from underneath a hood 34 that is attached to the top of the tank 17. The hood 34 may be formed of a plastic material and covers the various valves and air connecting hoses for the unit. It also has mounted on the front panel thereof, a window 35 to accommodate the face of a low pressure gauge dial which may be viewed by the customer in an automobile that is having its tires checked. Both the hood 34 and the handle bars 32 and 33 are fastened securely to a pair of brackets 36 and 39 that are welded onto the tank 17, as indicated in FIGURE 3. The handle bars 32 and 33 are formed so as to turn outward horizontally at the rearward extremity, and they accommodate on the ends thereof a pair of hand grips 37 and 38 respectively.

The working elements of the details, including the air passageway connections, are illustrated in the fragmentary rear elevation shown in FIGURE 3 as well as in the schematic illustrations of FIGURES 4, 5 and 6. Referring now to those figures of the drawings, the elements and their operation will be understood from the following detailed description thereof.

The compressed air tank 17 is constructed in a spherical form in order to provide for adequate strength as well as to give the benefits of a compact unit. Thus, one benefit is that the air cart unit has its center of gravity centrally located for ease of handling of the unit by manual manipulation thereof.

The tank 17 is of adequate size and is filled with compressed air having a sufficient amount of pressure so that a substantial number of pairs of vehicle tires may be filled without adding additional compressed air to the tank.

The tank will be filled from any convenient source, e.g., the permanent compressed air outlet at a service station. Thus, compressed air is added to the tank 17 via a fill valve 41 which incorporates a standard type of check valve (not shown) therein. The valve 41 unit may be mounted on the tank 17 in any convenient manner, for example by threaded attachment to a welded hub 42 on the tank 17.

Tank 17 includes a drain cock or valve 43, located at the bottom of the tank 17 in order to drain periodically any accumulated moisture from within the tank. This drain cock 43 is preferably attached to a short bushing or hub 44 that is welded into the bottom of the tank 17 and forms a well for accumulation of the moisture. This well is preferably located at the lowest point on the tank 17 when it is positioned in its stationary attitude, i.e., like that illustrated in FIGURE 2.

The elements employed for transmitting compressed air from tank 17 to the tires to be inflated include a manifold block 48 that is connected to and mounted on the tank 17 by a short pipe 49. The pipe 49 makes an airtight connection from the interior of tank 17 to a manifold passageway 50, within the block 48, via a passageway 51 that connects with and thus includes the interior of the pipe 49 and a drilled and threaded hole 52 through the wall of the tank 17.

Manifold passage 50 (in the block 48) has three outlet passages or connections therefrom so that connection directly to the high pressure air from the interior of tank 17, is made to each of the following three elements.

A high pressure gauge 54, is connected to one end of the manifold passage 50 via a passage 55 (FIGURE 5). In this manner the gauge 54 will always register the air pressure within the tank 17. While various pressure ranges could be employed, it is contemplated that for service station use the tank 17 will be designed for maximum pressure strength at 220 p.s.i. while the working pressure maximum employed will be 175 p.s.i. in order to maintain a margin of safety.

The second element connected to manifold passage 50 is a pressure relief valve 58. This valve may be any feasible type of air safety valve, and is preferably one with its adjustment made for a setting of 200 p.s.i. in order to insure that there will be no over pressure within the tank 17. As indicated schematically in FIGURES 4 and 5, relief valve 58 may be directly attached at the open end of the manifold passage 50. This may be done by any convenient means, such as by a tapped portion (not shown) on the end of the drilled hole which forms the passage 50.

The third element connected to the manifold passage 50 is a pressure reducer 59. This is connected to the manifold passage 50 via a transverse passage 60, drilled in the manifold block 48 to intercept the drilled passage 50. Reducer 59 may take any feasible form, for example it may be a commercial item manufactured by Jarett Compressor & Equipment, Inc., Newark, New Jersey, and designated as a Mini-Reg. Model 4 MI–¼ inch size.

The output of reducer 59, will be a predetermined low pressure, e.g., a maximum of sixty p.s.i. which is carried over a pipe or air hose 61 to the inlet connection for a three-position control valve 62. It will be appreciated that one purpose for this reducer is to protect the elements on the output, or low pressure side of the reducer against any over pressure which might damage them.

Control valve 62 may take any feasible form. It is schematically illustrated in FIGURE 6. The particular structure of the valve 62 that is employed in the illustrated combinations, forms no part per se of the invention; and one type of commercially available valve which may be employed is described as a three-position ¼ inch fourway spring biased valve. One such commercial valve is available from the Fluid Power Division of Aurora Corporation of Illinois, located at 8810 Harvard Avenue, Cleveland, Ohio.

As schematically indicated in FIGURE 6, the control valve 62 has a chamber 64 which is substantially sealed off when the valve is in the neutral position, i.e., that position of elements which is illustrated in full lines in FIGURE 6. This chamber 64 is formed within a cylindrical bore 63 of a housing 65. The chamber 64 exists between a pair of piston-like ends or large diameter portions 67 and 68 on a spool 66. The spool 66 has a reduced diameter or shaft portion 69 separating each of the pistons 67 and 68. In each case the piston 67 and the piston 68 is spaced so as to be in sealing or closing relation to a corresponding pair of ports 71 and 72 that extend through the housing 65 of the valve 62. This closing relationship to the ports 71 and 72 is maintained while the spool 66 is in its neutral or centralized position, and this central position is normally maintained by a pair of coil springs 73 and 74 located at each end of the spool 66. The movement of spool 66 longitudinally within its chamber 64 is limited such that the central portion of chamber 64 between the pistons 67 and 68 is always maintained in connection with the pipe 61 via an inlet port 75. On the other hand port 72 is not employed and could be omitted. Consequently, there is a plug 78 shown permanently closing the port 72.

In operation of the valve 62 the spool 66 will be shifted to one of three separate control positions. Thus, it is biased to the neutral position illustrated in solid lines in FIGURE 6. And, it may be shifted to either of an exhaust or fill position so that the outlet connection from the valve may be alternatively completed to pressure or to exhaust. Such outlet connection from the valve is carried over a pipe 79 that is connected to the port 71. Thus, when the spool 66 is shifted from the neutral position, it moves either upward or downward (as viewed in FIG. 6) so as to open port 71 in the alternative for connection either to the chamber 64 within the control valve 62, or to the atmosphere via open end of the bore 63, respectively. It will be noted that when the valve is positioned for exhaust (of the connections from pipe 79) the pressure supply within chamber 64 will remain sealed since port 72 is plugged off and the lower piston 68 remains within the bore 63. The latter condition is illustrated in dashed lines, showing the positions of pistons 67 and 68 when in the lower position thereof.

Similarly, in the "filling" position of the control valve 62, the output of reducer 59 will be connected via chamber 64 within the valve, to the port 71 and pipe 79 which is connected thereto. Under these circumstances, piston 67 will be in its upper position (not illustrated) such that the port 71 is opened for connection with the chamber 64 within the valve 62.

The springs 73 and 74 are supported by any feasible structure, e.g., corresponding brackets 80 and 81 attached to the housing 65 but allowing the bore 63 to be open for connection to the atmosphere.

The pipe 79 carries the so-called output connection from control valve 62. This leads from the control valve to a T-connector 82 (FIGURE 3) so that a low pressure gauge 83 is connected into the pipe 79 while a pipe 84 continues on from the other side of T-connector 82 to another manifold passage 86 (FIGURE 4) within the body of the manifold block 48. Short internal passages 89 and 90 (FIGURE 4) both connect with the manifold passage 86 and lead to a pair of elbow connectors 87 and 88 that have the ends of the air hoses 16 and 15 respectively connected thereto. The free ends of these air hoses 15 and 16 have attached thereto an inflator chuck 94 and 93 respectively, one on each hose. These chucks each have a clip-type structure which has a wing or lever 95 and 96, one for each chuck 93 and 94 respectively. These chucks act to grip the air valve stems of the tires that are being inflated.

It may be noted that the low pressure gauge 83 is arranged with a large sized indicator dial 100 that has the pointer thereof visible through the open face or window 35 in the front of the hood 34.

The operation of the control valve 62 is manually controlled by a lever 103 having a knob 104 at the free end thereof, and being connected into the structure of the valve in any feasible manner (not shown) with a bellows style protective jacket 105 surrounding and providing dust and dirt protection for the pivot or other type joint between the lever 103 and the internal structure of control valve 102.

OPERATION

A typical operation employing the air cart according to this invention, might be one involving the servicing of a customer's automobile at a gasoline service station, for example. A preferred manner of using cart is as follows: When a customer drives up to the gasoline pump island at a service station, and while his gasoline tank is being filled, the service station attendant will bring the air cart 11 over (from its resting place out of the driveway) and park it in front of the customer's automobile 12. He will preferably park it with the front of the air cart (i.e., the side that is viewed in FIGURE 1) facing toward the driver of the automobile. Thus, while the illustration of FIGURE 1 shows the air cart faced away from the automobile passengers, in actual use it is preferred that it be faced in the other direction as just described so that the automobile driver or passengers may observe the gauge dial 100 that shows through the window 35 in the hood 34 and indicates the pressure in the tires as they are being filled.

After bringing the cart into position, the attendant will then quickly take each of the air hose coils in turn and fasten the air chuck onto the stem of the valve of each of the front tires of the car. As soon as these air hoses are in place on the valve stems of the automobile tires, the attendant will set the pressure level desired by adjusting pressure as indicated by gauge dial 100 of the low pressure gauge 83. He merely needs to manipulate the knob 104 to rock shaft 103 and actuate control valve 62, so as to admit air under pressure from the tank 17 into the tires via the pressure reducer 59. He only needs to hold the control valve lever 103 in the proper position long enough to allow the pressure to reach its desired value, and then he can release the lever to its spring biased neutral position. Thereafter he will disconnect the air hoses from the valve stems of the tires and replace the dust caps.

If it should turn out that the air pressure in the tires is above that desired, this will be indicated by the low pressure gauge and the indicator dial 100. Then the operator need merely move the control valve lever the opposite direction from that for filling the tires. This will connect the air hoses and low pressure gauge directly to exhaust, at the control valve 62. This, in turn, will reduce the pressure in the tires to the desired level when the operator will release the lever.

It may be observed that the releasing of the control lever to its neutral position (where the control valve cuts off the air supply) also holds the pressure which has been applied via the air hoses. Consequently all that remains to be done is to release and remove the air hose chucks from the automobile tire valve stems, and the hoses will coil themselves and can be replaced rapidly on a pair of support trays 107 and 108 which extend out on either side (from the hood 34) and hold the coils of hose when the air cart is not in use. There are a pair of identical key slot holders 106 for receiving the chucks 93 and 94 when the hoses 15 and 16 are not in use.

Finally the air cart itself may be quickly moved out of the path of the automobile by the attendant. He will grip the handle bars and push down (with added force if necessary applied by foot on the rearwardly extending foot pad 29) so that the cart will be tipped onto its tricycle wheel support and can be rolled quickly to a convenient position out of the way.

Of course, the procedure for filling the back tires will be substantially the same. Also, if it is desired to fill a spare tire, only one of the hoses 15 and 16 need be employed and the rest of the procedure will be the same as for a pair of tires.

It will be noted that the front support leg 20 of the cart has the long forward portion thereof covered with a soft material, such as rubber or the like, to act as a bumper and avoid any scratching of a customer's automobile during the process of moving the air cart into or out of the position when the automobile tires are being filled.

While a particular embodiment of the invention has been described in considerable detail in accordance with the applicable statutes, this is not to be taken as in any way limiting the invention but merely as being descriptive thereof.

I claim:
1. A portable compressed air supply cart for servicing automobiles, comprising in combination:
   a generally spherical tank for containing a supply of compressed air at relatively high pressure,
   a wheeled support for said tank to render it portable,
   a pair of air hoses having outlet chucks at the free ends thereof,
   means for connecting the other ends of said hoses in common to said tank,
   a three position valve,
   said connecting means comprising a manifold and means for connecting said common hose connections to said three position valve,
   additional means for connecting said three position valve to said tank,
   a large dial low pressure gauge visible from the outside of said cart at a maximum angle therefrom, and
   means for connecting said gauge to said manifold and connecting means in order to have said gauge indicate the pressure existing in said pair of hoses and the tires connected thereto,
2. A portable compressed air supply cart according to claim 1, wherein said additional means comprises pressure reducing means for reducing the high pressure in said tank before delivery to said three position valve.

References Cited

UNITED STATES PATENTS

| | | | |
|---|---|---|---|
| 2,384,174 | 9/1945 | Jones | 222—176 X |
| 2,735,589 | 2/1956 | Milster et al. | 222—176 X |
| 3,255,771 | 6/1966 | MacSpadden | 137—355.12 |

FOREIGN PATENTS 1,302,014   7/1962   France.

LAVERNE D. GEIGER, *Primary Examiner.*

H. S. BELL, *Assistant Examiner.*